(12) United States Patent
Tapia et al.

(10) Patent No.: US 9,118,801 B2
(45) Date of Patent: Aug. 25, 2015

(54) OPTIMIZING VIDEO-CALL QUALITY OF SERVICE

(71) Applicant: T-Mobile USA, Inc., Bellevue, WA (US)

(72) Inventors: Pablo Tapia, Snoqualmie, WA (US); Kevin Lau, Bellevue, WA (US); Alexandru Catalin Ionescu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 21 days.

(21) Appl. No.: 13/658,745

(22) Filed: Oct. 23, 2012

(65) Prior Publication Data

US 2013/0100228 A1    Apr. 25, 2013

Related U.S. Application Data

(60) Provisional application No. 61/550,870, filed on Oct. 24, 2011.

(51) Int. Cl.
*H04N 7/14* (2006.01)
*H04N 21/262* (2011.01)

(52) U.S. Cl.
CPC ........... *H04N 7/14* (2013.01); *H04N 21/26216* (2013.01); *H04N 2007/145* (2013.01)
USPC .................. 348/14.01; 348/14.02; 348/14.08; 348/14.09

(58) Field of Classification Search
CPC .................. H04N 21/26216; H04N 2007/145; H04N 7/14; H04N 7/141; H04N 7/142; H04N 7/147; H04N 7/148; H04N 7/15; H04N 7/152
USPC ............................................ 348/14.01–14.16
See application file for complete search history.

(56) References Cited

U.S. PATENT DOCUMENTS 6,731,325 B1  5/2004 Qi et al.
7,072,678 B2  7/2006 Allison
(Continued)

FOREIGN PATENT DOCUMENTS

WO  WO2005055504 A1  6/2005
WO  WO2006012911 A1  2/2006
(Continued)

OTHER PUBLICATIONS

Office Action for U.S. Appl. No. 13/189,281, mailed on Aug. 9, 2013, Lau et al, "Rate Adaptation for Video Calling", 9 pages.
(Continued)

*Primary Examiner* — Melur Ramakrishnaiah
(74) *Attorney, Agent, or Firm* — Lee & Hayes, PLLC

(57) ABSTRACT

Techniques to optimize video-call communications are disclosed. The link quality capability of a wireless video-call session and the requirements of the video-call session are determined. The link quality capability determination is based at least on measurements through the entire communications chain, including user, client device, operating system, application, air interface, cell sector, and backhaul parameters. Those parameters may be determined from static profiles, dynamically determined or be statistically derived. Client device response may include adapting the rate of data captured by a video camera, microphone, or other data capture device used in the video-call session. For video-conferencing scenarios, communications throughput is optimized by consolidating video streams.

20 Claims, 6 Drawing Sheets

(56) References Cited

U.S. PATENT DOCUMENTS

| | | | |
|---|---|---|---|
| 7,103,669 B2 | 9/2006 | Apostolopoulos | |
| 7,171,460 B2 | 1/2007 | Kalavade et al. | |
| 7,418,497 B2 | 8/2008 | Hagale et al. | |
| 7,689,650 B1 | 3/2010 | Sanghavi et al. | |
| 7,701,925 B1 | 4/2010 | Mason et al. | |
| 7,787,445 B2 | 8/2010 | Marsico | |
| 7,899,862 B2 | 3/2011 | Appelman et al. | |
| 8,115,797 B2 | 2/2012 | Whited et al. | |
| 8,370,432 B2 | 2/2013 | Digate et al. | |
| 2001/0034222 A1* | 10/2001 | Roustaei et al. | 455/403 |
| 2004/0186887 A1 | 9/2004 | Galli et al. | |
| 2004/0207508 A1 | 10/2004 | Lin et al. | |
| 2005/0108417 A1 | 5/2005 | Haumont | |
| 2005/0238156 A1 | 10/2005 | Turner | |
| 2005/0259601 A1 | 11/2005 | Rosenberg et al. | |
| 2006/0023729 A1 | 2/2006 | Choi et al. | |
| 2006/0268751 A1* | 11/2006 | Baird et al. | 370/260 |
| 2006/0277256 A1 | 12/2006 | Tiruthani et al. | |
| 2007/0156924 A1 | 7/2007 | Ramalingam et al. | |
| 2008/0043644 A1 | 2/2008 | Barkley et al. | |
| 2008/0137541 A1 | 6/2008 | Agarwal et al. | |
| 2008/0244019 A1 | 10/2008 | Mellor et al. | |
| 2008/0267069 A1* | 10/2008 | Thielman et al. | 370/235 |
| 2009/0005037 A1 | 1/2009 | Noldus et al. | |
| 2009/0034610 A1 | 2/2009 | Lee et al. | |
| 2009/0069057 A1* | 3/2009 | Haartsen et al. | 455/574 |
| 2009/0116458 A1 | 5/2009 | Ramesh et al. | |
| 2010/0034106 A1 | 2/2010 | Hu et al. | |
| 2010/0040347 A1 | 2/2010 | Kent, Jr. et al. | |
| 2010/0118114 A1* | 5/2010 | Hosseini et al. | 348/14.09 |
| 2010/0229210 A1 | 9/2010 | Sharp et al. | |
| 2010/0272101 A1 | 10/2010 | Ku et al. | |
| 2010/0316066 A1 | 12/2010 | Leung | |
| 2011/0025820 A1 | 2/2011 | Fisher et al. | |
| 2011/0249073 A1 | 10/2011 | Cranfill et al. | |
| 2011/0249086 A1 | 10/2011 | Guo et al. | |
| 2011/0250869 A1 | 10/2011 | Mahajan | |
| 2012/0079016 A1 | 3/2012 | Hung et al. | |
| 2012/0140018 A1* | 6/2012 | Pikin et al. | 348/14.02 |

FOREIGN PATENT DOCUMENTS

| | | |
|---|---|---|
| WO | WO2007016472 A2 | 2/2007 |
| WO | WO2008070869 A2 | 6/2008 |
| WO | WO2010052570 A1 | 5/2010 |

OTHER PUBLICATIONS

PCT Search Report and Written Opinion mailed Mar. 29, 2013 for PCT Application No. PCT/US12/61608, 11 pages.
Office Action for U.S. Appl. No. 13/211,155, mailed on Dec. 30, 2013, Kevin Lau, "Video Presence Sharing", 11 pages.
PCT Search Report and Written Opinion mailed May 4, 2012 for PCT Application No. PCT/US11/54785, 9 pages.
Final Office Action for U.S. Appl. No. 13/211,155, mailed on May 29, 2014, Kevin Lau, "Video Presence Sharing", 11 pages.
Office Action for U.S. Appl. No. 13/211,155, mailed on Dec. 15, 2014, Kevin Lau, "Video Presence Sharing", 10 pages.
Final Office Action for U.S. Appl. No. 13/211,155, mailed on Mar. 17, 2015, Kevin Lau, "Video Presence Sharing", 7 pages.
Extended European Search Report mailed Jun. 29, 2015 for European patent application No. 12844332.2, 8 pages.

* cited by examiner

OPTIMIZING VIDEO-CALL QUALITY OF SERVICE

RELATED APPLICATIONS

This patent application claims priority to U.S. patent Provisional patent application "Optimized Video-Call Quality of Service", Ser. No. 61/550,871, filed Oct. 24, 2011, which is incorporated by reference in its entirety herein.

BACKGROUND

Increasing numbers of user have come to make video-calls on electronic multimedia terminals such as personal computers with web cameras ("webcams") and microphones. Specifically, a user is able to create a communications connection with one or more other users with electronic multimedia terminals, and transmit and receive both voice data and video data to those users. Typically the video data will be of the user, but alternatively could be a video camera view of some other object, as is common with multi-camera smart phones. In other scenarios, such as video conferencing, the video may be of a static document, such as a text document or a spreadsheet.

As mobile terminals, including smart phones and mobile tablets have acquired multimedia capabilities; those mobile terminals have come to support video-calls as well. Such mobile terminals are typically wireless devices with less bandwidth than non-mobile clients with fixed networks. Wireless mobile terminals may make use of unlicensed spectrum such as Wi-Fi or make use of licensed spectrum such as the air interface to cellular carriers. In addition to potentially having less bandwidth, a particular communications link's bandwidth may fluctuate based on changing conditions. For example, a wireless network may have less bandwidth for a particular communications link during peak hours as opposed to the middle of the night. Alternatively, a wireless network may have less bandwidth due to a temporary router outage.

To adapt to fluctuating wireless communication bandwidth, and in general to fluctuating link quality capabilities, video-call software clients may adapt their data transmission rate based on available link quality capabilities, by capturing the video data from a client device video camera, and then using in-software transformations to change the resolution of the transmitted video data to match available bandwidth. Specifically, where there is less link quality capability, the video-call software client decreases the resolution of the transmitted video and where there is more link quality capability, the video-call software increases the resolution.

However, in-software transformations to throttle data throughput for video-calls makes extensive use of processor resources and battery power. Accordingly, there is an opportunity to optimize video calls by adapting data transmission rates without processor intensive in-software transformations, and thereby preserving processor cycles and battery lifetime.

Furthermore, the efficacy of present video-call adaptation techniques is based on measuring link quality capability for a call. However present video-call adaptation techniques are optimized for wired communications, rather than wireless communications. Accordingly, present video-call adaptation techniques do not take into account link quality fluctuations caused by interruptions in the wireless communications stack, resulting in sub-optimal adaption.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

The Context of Video-Call Optimization

Figure 1:
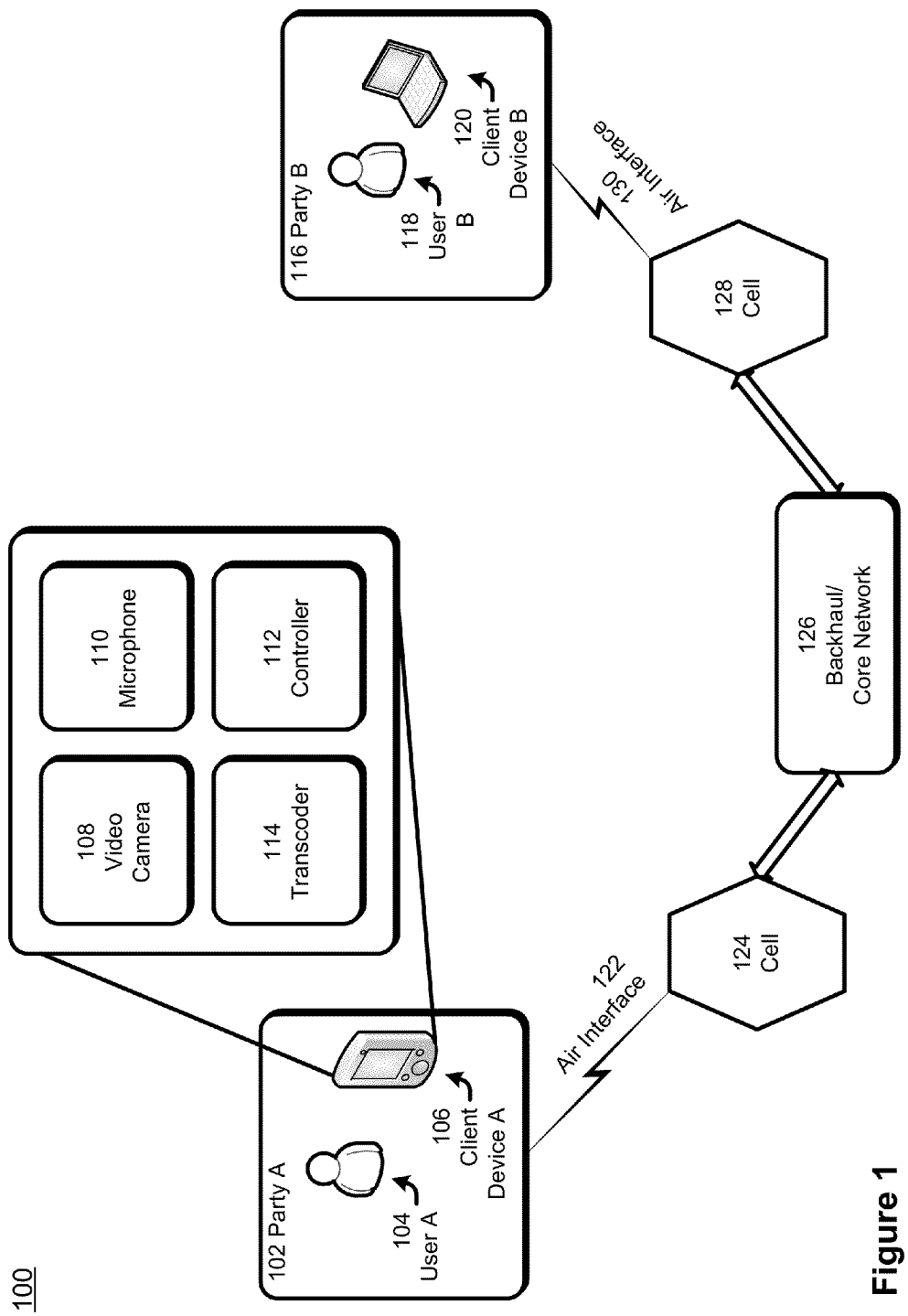
FIG. 1 is a top-level diagram illustrating the context of video-call adaptive camera resolution.

Video-calls are calls from one terminal to another, where each party may both hear and see the other parties communicate. Video-calls between consumers may be between only two parties and limited to audio and video of the parties themselves. Video-calls in an enterprise context may be of more than two parties and may be supplemented with multi-media presentations. Multi-media presentations may include office documents, videos of content other than the speakers, and still images. Audio may be of greater quality than voice quality, and may be high fidelity sufficient for accurate music reproduction. Multi-media, multi-party calls are called video conferencing.

Video and multi-media communications require significantly higher link quality than voice communications. Link quality may relate simply to bandwidth capacity. Alternatively, link quality may relate to non bandwidth capacity measures such as network congestion. Link quality may relate to radio signal quality including radio signal quality parameters such as signal strength, variance, and reliability.

Even though wireless communications channels have increasingly higher and higher link quality capabilities, a video-call may require a higher link quality than available on the video-call session channel. Furthermore, although the link quality capability of a video-call communications connection may be sufficient under peak conditions, the link quality may periodically undergo temporary drops. Accordingly, to provide an acceptable quality of service ("QoS") or quality of user experience ("QoE") a communications terminal in a video-call may adapt the amount or rate of data to send in over the communications link.

Present video-call data rate adaptation has two key limitations. First, the video-call adaptation relies on software techniques to change the data rate. With this technique, much processing resources are used to reduce or adapt the video-call data rate. Correspondingly, the power draw is relatively high. As a result, for mobile communications terminals, battery life is compromised. This disclosure describes reducing the amount of data captured, where link quality capability is lower, and describes increasing the amount of data captured when there is higher link quality capability. Since the video camera does not capture the data in the first place, it need not be removed via software, saving processing time and power.

Second, the efficacy of video-call adaptation relies on the accuracy of the information used to characterize the communications link. Present communications link characterization is based on wired communication links rather than wireless communications links. Accordingly, communications link characterization is missing valuable information specific to wireless communications. Furthermore, user and communications terminal specific information, either from the caller or the receiver, is not presently utilized to characterize video-call requirements. In the latter scenario, a communications terminal could conceivably utilize information from the sending communications terminal, server information about the characteristics of the communications link, and the local communications terminal characteristics, all to provide an extremely accurate picture of the video-call link quality capability and link quality requirements. This information would enable a superior video-call data rate adaptation capability.

FIG. 1 illustrates an exemplary environment 100 for the disclosed video-call optimizations.

Party A 102 is participating in a video-call session. Party A 102 comprises user A 104 and client device A 106, a communications terminal Client device 106 is equipped to support video-calls. Accordingly, it may have a video camera 108 and a microphone 110. Controller 112 controls the various parameter settings for a video camera 108 and a microphone 110. For example, controller 112 can specify the data capture frame rate and the operating resolution of video camera 108, and may modify these parameters dynamically during run time. Where there are additional video cameras and transducers, controller 112 may also select which ones are active. Client device 106 also has a transcoder 114 to convert raw data captured by the video camera 108 and/or microphone 110 into a data format amenable for data processing and transmission. Client device 106 is discussed in more detail with respect to FIG. 3.

Party B 116 is also participating in the video-call. As with party A 102, party B 116 comprises user B 118 and client device B 120. Note that the client device B 120 need not be the same type of client as client device A 106. For example, client device A 106 may be a smart phone and client device B 120 may be a laptop computer. Client devices may be any communications terminal capable of supporting a video-call, and may include personal computers, tablet computers, and other handheld communications terminals.

Both party A 102 and party B 116 communicate via a wireless video-call session. In exemplary environment 100, client device A may communicate via air interface 122 to a cellular tower in cell sector 124. Client device A 106 may access air interface 122 in any number of ways. In one example, client device A 106 may access air interface 122 via a data connection via a cellular radio. Alternatively, client device A 106 may receive data via Wi-Fi and forward the data to the data connection via the cellular radio by tethering.

In a cellular communications embodiment, cell sector 124 may forward video-call data to a cellular core network via backhaul 126. Cellular core network examples may include implementations conforming to 3GPP and 3GPP2 standards.

The core network 126 then forwards video-call data to party B's 116 local cell sector 128, which then transmits the video-call data to client device B 120 via air interface 130.

Exemplary Hardware Platform

Figure 2:
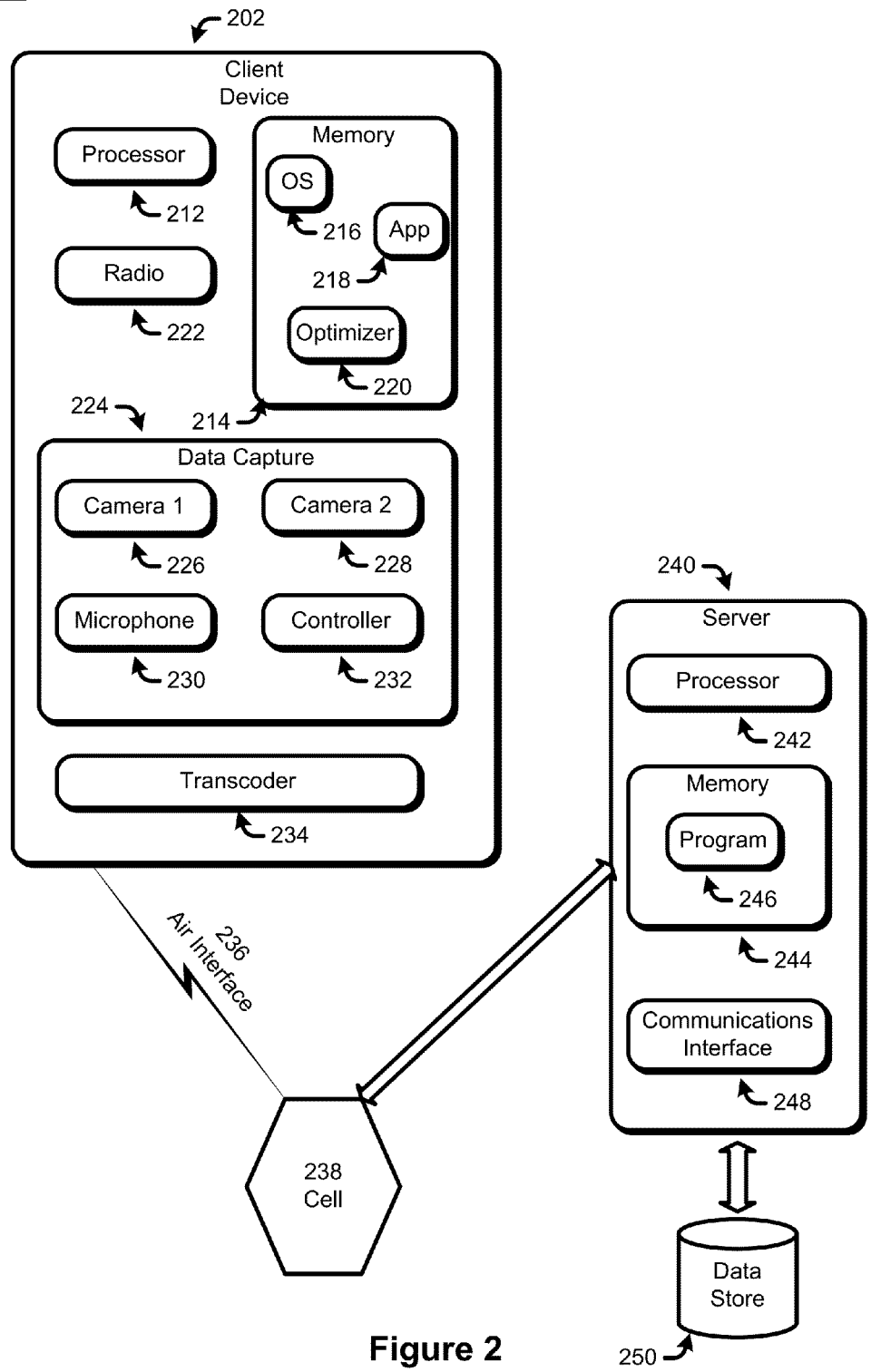
FIG. 2 is a diagram of an example hardware platform for video-call adaptive camera resolution.

FIG. 2 illustrates one possible embodiment of a hardware environment 200 for video-call optimization. Specifically FIG. 2 illustrates a client device 202 configured to adapt the data collection rate from various inputs during a video-call session.

Client device 202 is any computing device with a processor 212 and a memory 214.

Client device 202's memory 214 is any computer-readable media which may store several programs including an operating system 216, a video-call application or service 218, and a video-call optimizer 220. In this way, client device 202 has software support for video-calls and video-call optimization. Memory 214 may additionally store non-executable data such as video-call communications measurements and video-call metadata.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Programs 216, 218, 220 comprise computer-readable instructions including an operating system 216 and other system functionality as well as user applications such as a video-call client 218 and a video-call optimizer 220. The operating system may support the ability to trap application events and communications performance. Trapping application events enables a program to capture observable data. Examples include, but are not limited to journaling hooks and trampoline functions. In general, a trapped application event may be associated with a programmatic handler which in turn stores input and/or output parameter data associated with the operation of the event. In this way, an arbitrary software event, may be monitored and then stored.

Client device 202 will have a wireless communications interface in the form of a radio 222. Radio 222 may support unlicensed spectrum communications such as Wi-Fi, or licensed spectrum such as WCDMA and CDMA2000. Alternatively, client device 202 may have multiple radios to support both unlicensed and licensed spectrum communications.

Client device 202 has a data capture facility 224 to provide hardware support for video-calls and video-call optimization. Data capture facility 224 may have either a single video camera 226 or a plurality of video cameras 226, 228 for video input. Data capture facility 224 may have a microphone 230 for audio input. Data capture facility 224 may also have any number of non-video and non-audio sensors as potential inputs. All inputs 226, 228, 230 may be dynamically controlled via one or more controllers 232. Controller 232 may control various parameters for the input devices such as frame capture rate and resolution. Controller 232 may perform analogous increases and decreases to data flow rates from the other inputs without loss of generality. Controller 232 may buffer or store raw data in memory 214.

Client device 202 may also have a transcoder 234 to translate the stored raw data into a format amenable for further processing and transmission via radio 222.

Client device 202 communicates via an air interface 236 to a cellular tower in its local cell sector 238. The local cell sector 238 is constantly measuring, tracking and storing cellular conditions for the air interface 236 and for the towers in the local cell sector 238. The client device and/or the local servers may modify operation according to a static profile, a statistical profile, or via dynamically reacting substantially in real time to the measured cellular conditions. The frequency of the modifications may be optimized. For example, instead of polling with a fixed linear period, such as every 2 seconds, the polling may be interpolated. If the present poll is substantially similar to the previous poll, the next polling period may be increased to 3 seconds. However, if the present poll is substantially different to the previous poll, the next polling period may be decreased to 1 second. The interpolation may be by percentage, or by a fixed amount of time to modify. In the previous example, there may have been a 50% increase/decrease, or a 1 second linear change, some minimum polling time specified.

Cell sector 238 then forwards the video-call data and associated metadata via a backhaul to the core network. The communications link and associated profiles are described in more detail with respect to FIG. 3.

Both local cell sector 238 and backhaul/core network have a number of servers 240. Server 240 is any computing device capable of support video-call sessions and to support video-call optimizations. The server 240 comprises processor 242, memory 244 and communications interface 246. As per the preceding discussion regarding client 202, memory 244 is any computer-readable media including both computer storage media and communication media.

In particular, memory 244 store programs 246 which may include an operating system and computer-readable instructions to support video-call sessions and video-call optimizations.

Memory 244 may also store programs 246 that may include a database management system if data store 250 is configured as a database. Data store 250 may be configured as a relational database, an object-oriented database, a columnar database, or any configuration supporting queries of present and historical video-call communications link characteristics.

Exemplary Communications Stack

Figure 3:
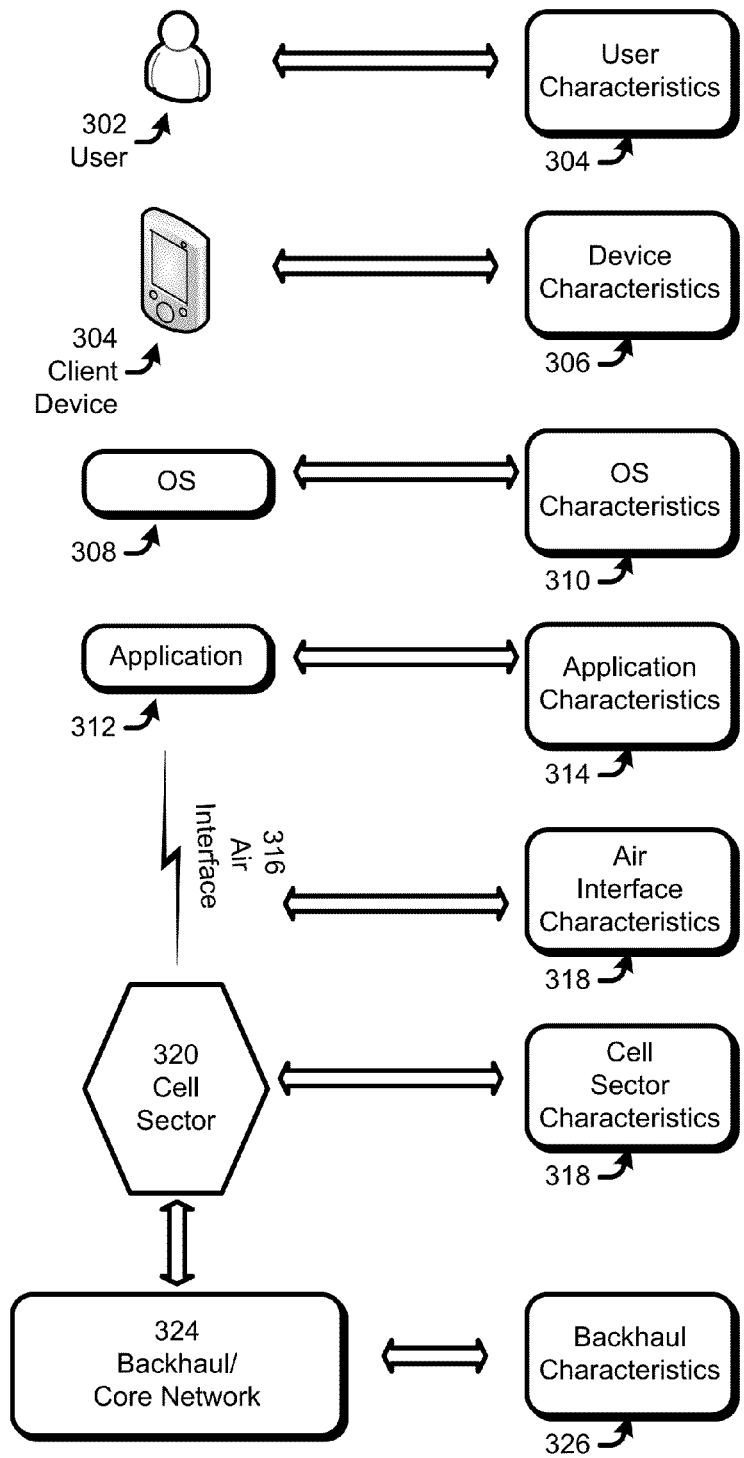
FIG. 3 is a diagram of an example communications stack with instrumentation to support video-call adaptive camera resolution.

FIG. 3 illustrates an exemplary wireless communications stack 300 that may be used for a video-call session. In effect, the communications stack 300 illustrates a chain of communications links where each layer has its own specific characteristics, and may be instrumented separately to measure those characteristics. Those characteristics may then be shared up and down the stack or chain to optimize the video-call.

Characteristics may be static, statistical or dynamic. Specifically, characteristics may be stored in a static profile and accessed by other layers, such as the optimizer in a communications terminal. The static profile may reside on a communications terminal in memory, or alternatively may be accessible on a remote server.

Characteristics may be dynamically determined. Specifically, characteristics can be measured in real time or substantially in real time. As those characteristics are measured, they can be communicated up and down the stack or chain to optimize the video call.

Characteristics may also be stored in a knowledge base. As various measurements are made by various participants in the communications stack or chain, those measurements may be stored in a server or database. Once stored, those measurements may be indexed to different classes of video-calls. Specifically, an algorithm to measure the similarity between various video-calls may be applied, and those similar video-call's correlated together. For example, some video-calls might be characterized as peak calls. Other video-calls might be characterized as conference calls. Once correlated, the statistical analysis may be applied to the data relating to a class of video-calls. For example, one might calculate the average carrier to interference ratio for video-calls of a particular cell sector during a peak time window. Once calculated, this statistic data may be periodically recalculated and propagated up and down the communications stack or chain.

The communications chain or stack may start with user 302. User 302 is the video-call participant that initiates and responds to video-calls and responds to calls. Corresponding to user 302 is a user profile 304. Example user characteristics may include static user preferences such as expected QoS or QoE settings. Alternatively, user characteristics may include dynamic or statistical measurements of how often the user participates in video-calls, the duration of the video-calls, and the likelihood that additional material, such as office documents are shared.

The user 302 uses a client device 306. Corresponding to client device 306 is client device profile 308. Client device characteristics may include static information such as the make and model of the client device, the number of video cameras on the client device and their respective resolution capabilities. Dynamic characteristics may include power utilization curves, and frequency of transmission/reception errors as measured on the device.

Client device 306 runs an operating system 310. Corresponding to operating system 310 is operating system profile 312. Operating system characteristics may include name, version number and build of the operating system. Dynamic characteristics may include number of background processes running, and the identity of services running concurrently.

Operating system runs video-call application 314. Corresponding to video-call application 314 is video-call application profile 316. Static characteristics may include the name and build of the video-call application. Dynamic characteristics may include the identity of system services used by the video-call application 314, the type of video-call of the video-call applications, and the type of content transmitted over the video-call. Example types of content may include, whether the content is enterprise data including office documents, or adult content, or video-conference data, Client side characteristics, including user characteristics, client device characteristics, operating system characteristics, and video-call application characteristics may be measured and detected on the client device. These characteristics generally relate to the link quality requirements for a video-call session, but may also relate to the link quality capability of a communications link for a video-call. These characteristics may be polled, or measured upon detection of an event. The characteristics may also be collected upon a user directive, such as a button push in an application. The client device may periodically push an archive of stored characteristics to a server on the network for later analysis. Alternatively, the client device may periodically push an archive of stored characteristics to another communications terminal in the video-call session for that communications terminal to perform other optimizations.

Video-call application 314 transports video-call data over air interface 318. Corresponding to air interface 318 is air interface profile 320. Air interface characteristics may include channel quality information ("CQI") characteristics, a carrier to interference ratio, a discontinuous reception metric ("DRX") and a discontinuation transmission metric ("DTX"). Air interface characteristics 320 may be detected by a client device or alternatively by the base station. When detected by the base station, the base station may periodically push air interface characteristics 320 to the client device.

Air-interface 320 connects to a cellular tower and cellular base station in a local cellular sector 322. Corresponding to cellular sector 322 is cellular sector profile 324. Example cellular sector 322 characteristics may include sector load, geographical information and mobility. For example, a base station in the cellular sector may average call load by time. Alternatively, a base station may note that the sector contains a highway, and most calls include a larger than usual amount of roaming calls.

Cellular sector 324 forwards video call data via backhaul to the core network 326. Corresponding to backhaul/core network 326 is backhaul/core network profile 328. Example backhaul/core network characteristics 328 may include processing load over time and load from processing billing and metering.

For network side characteristics including air interface characteristics 320, cell sector characteristics 324 and backhaul/core network 328, measurements can be made on servers in the base station or the core network. These characteristics generally relate to the link quality capability of a video call session. These characteristics may be periodically pushed to one or more communications terminals participating in a video-call session. In this way, those communications terminals may optimize video-calls using wireless radio communications characteristics.

Data Capture Rate Adaptation

Figure 4:
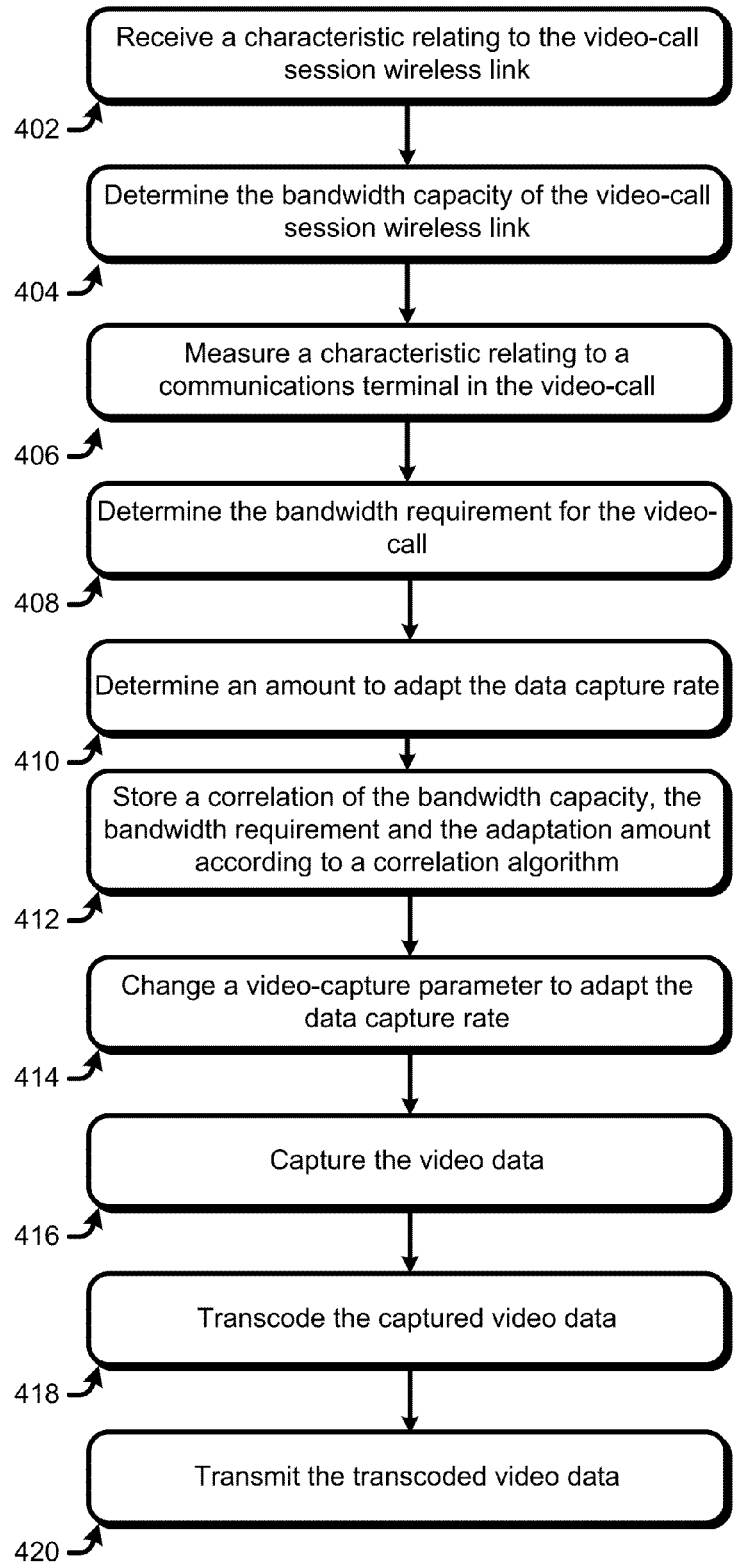
FIG. 4 is an exemplary flow chart of video-call adaptive camera resolution.

The foregoing discussion relates to an infrastructure to obtain and propagate characteristics that would impact a video-call up and down the communications stack and chain. FIG. 4 illustrates an exemplary process 400 of how a client device might adapt its data capture rate during a video call.

In block 402, a client device receives a characteristic relating to the video-call session communications link. The characteristic may be affirmatively pushed by the cell sector or by the backhaul/core network. In the alternative, the characteristic may be polled by the client device from the cell sector or backhaul/core network. In other alternative, the characteristic may be directly sampled by the client device, such as in locally measuring an air interface characteristic.

Upon receiving the characteristic, in block 404, the optimizer on the client device or alternatively on a remote server may determine a link quality capability for a video-call session to be initiated, or in progress. Alternatively, the optimizer may periodically perform a link quality capability determination without waiting for a characteristic to be received.

In block 406, the client device measures a characteristic relating to the client side characteristics of the video-call. Characteristics may include user characteristics, client device characteristics, operating system characteristics, video-call application characteristics. For example, a particular video-call application favored by the user may have a particularly high power draw. Alternatively, the user may demand high resolution video in his or her profile.

In block 408, the optimizer determines the link quality requirement for the video call using the characteristics collected in block 406.

Once the link quality capability is determined as in block 404 and the video-call link quality requirements is determined as in block 406, the optimizer makes a determination as to whether the video data capture rate needs to adapt. If the bandwidth at the time of the call is sufficient for the video-call link quality requirements, then no adaptation may be necessary. In the alternative, the optimizer may perform optimizations not specific to QoS or QoE, but may optimize to lengthen battery lifetime or minimize power draw.

In another alternative, the optimizer may see to increase the video-call data captured to provide increased corresponding QoS and QoE. If the link quality capability is not sufficient for the video-call link quality requirement, the optimizer will determine by how much the video-call data captured is to be decreased. Whether increasing or decreasing, the optimizer will make a determination of the amount to adapt the data capture rate.

In embodiments where statistical analysis is to be applied to video-call data, in block 412, the various characteristics collected, the link quality capability determination, the link quality requirement and other video-call characteristics may be stored locally or on a server. If stored locally, the client device may periodically upload this data in an archive to a server. The data may be affirmatively pushed, or affirmatively requested by the server. In this way, a knowledge base of various video-calls and their characteristics may be later analyzed and queried.

Once the amount to change the data capture rate or volume is known, in block 414, the controller of the video cameras may dynamically adapt the video camera configuration accordingly. In block 416, the raw video data is then captured.

The controller may perform the captured data rate adaptation by changing a video-capture parameter. For example, the controller may change the resolution from XVGA to VGA. By way of another example, the controller may change the sampling time from 60 frames per second to 42 frames per second. Note that these changes occur before transcoding. Because the data is eliminated prior to transcoding, there is no need to use processor resources or additional power to adapt the data capture rate. Furthermore, because no processor resources are used to adapt the data capture rate via software, lag time to stream the captured video data is decreased.

The video-capture parameter may be specific to the hardware itself. For example, where a client device has multiple cameras, each with a different resolution, the user might switch from a high resolution camera such as a camera pointed to an item other than the user, to a second low resolution camera such as one pointed to the user. In this case, the optimizer may increase resolution or data capture frame rate since a lower resolution camera is being used.

In block 418, the raw data captured in block 416 is transformed into a format for further processing or for transmission over wireless networks. In block 420, the transcoded data is then transmitted over the air interface.

It is to be emphasized that the optimizer may reside on either the client device or the server. In the latter embodiment, to save processing on the client device, an optimizer might reside on a server, and directives to the video camera controller might be sent remotely. Furthermore, where the optimizer resides on a server in the base station or in the core network, other parts of the communications stack might be adapted as well. For example, packets may be affirmatively dropped to save on the volume of data to be transmitted.

Video Teleconferencing Optimizations

Figure 5:
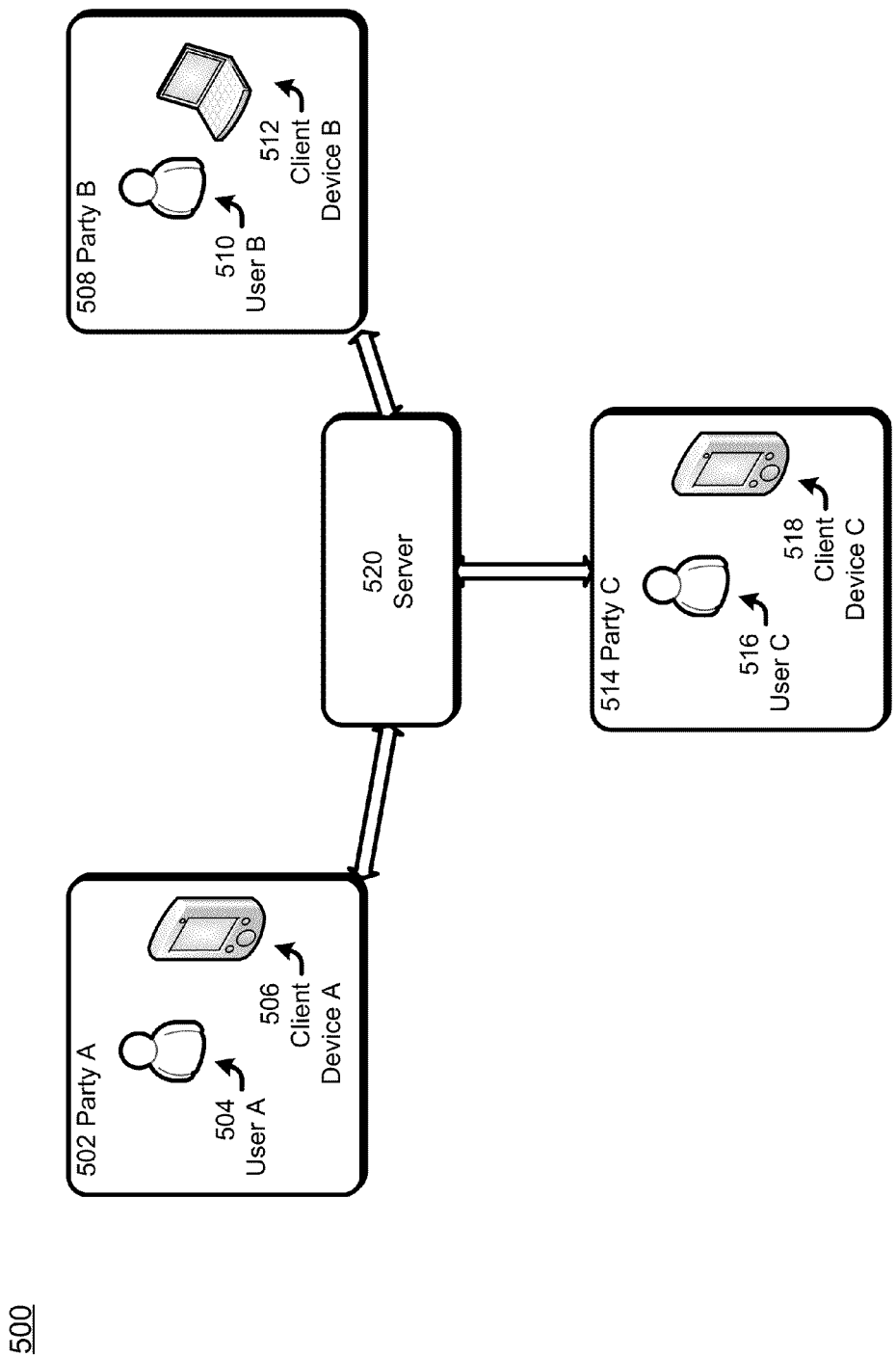
FIG. 5 is an illustration of some example video-call optimizations for video-conferencing.

One example of a client device and a server acting in concert to optimize a video-call is video teleconferencing. In video-teleconferencing, two or more parties communicate with video and audio data. Additionally, other data, such as document data may be shared. Often video cameras are used to point at items of discussion other than the parties. FIG. 5 illustrates an example of a video teleconference 500 that might be optimized.

Party A 502 comprises user A 504 and client device A 506. Party B 508 comprises user B 510 and client device B 512. Party C 514 comprises user C 516 and client device C 518. All three parties A 502, B 508 and C 514 are connected to video-call server 520. Again note that the client devices need not be the same. For example, one party may be in a fixed location with a large television monitor, whereas another party may be on a smart phone. The party with the smart phone will have a lower link quality requirement than the party with the television monitor. Similarly, the party in a fixed location may have a much higher link quality capability than a mobile party. By way of another example, a roaming mobile party may have a lower link quality capability as a non-moving mobile party. Note that if the mobile party is roaming, video might even be shut off if the optimizer determines that the user might be distracted while driving.

Figure 6:
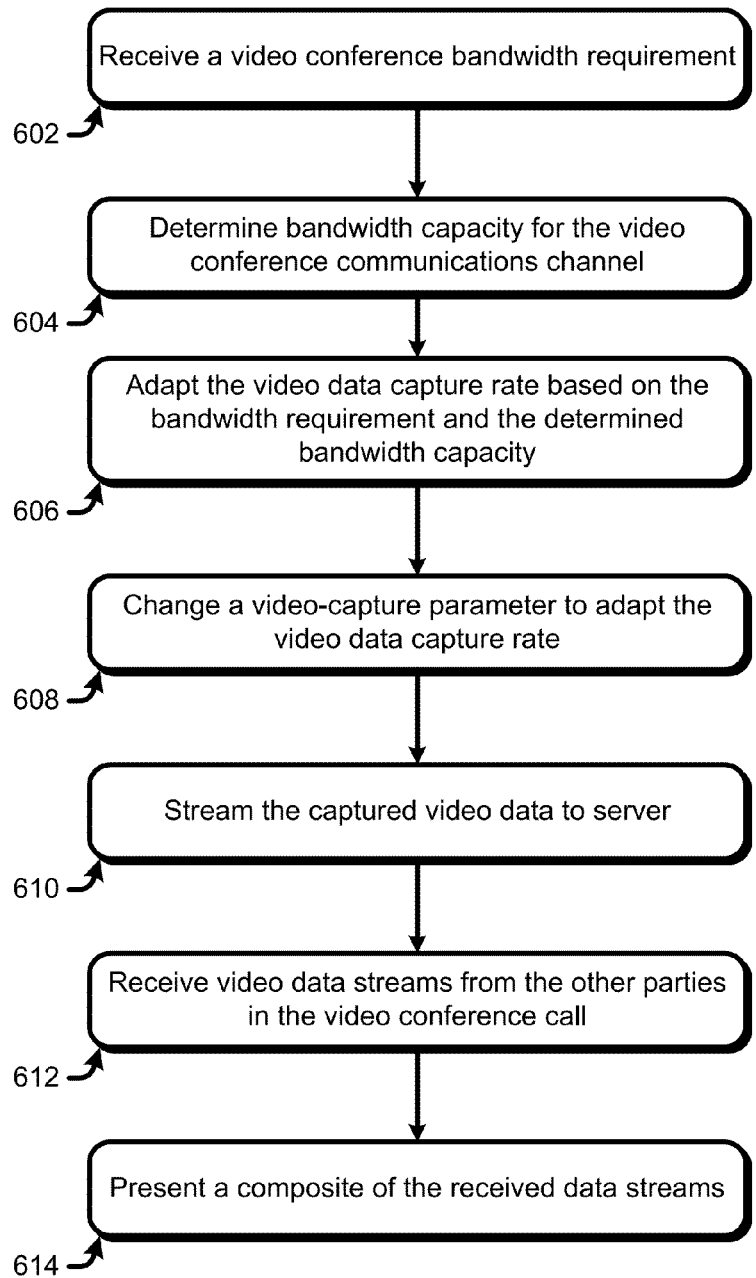
FIG. 6 is an exemplary flow chart of video-call optimization for video-conferencing.

In the foregoing descriptions, the video-call capture data rate is adapted by increasing or decreasing the amount of data to be streamed. FIG. 6 illustrates an example embodiment of video conference optimization 600 using these techniques.

In block 602 a client device 506 receives a video conference link quality requirement from the server 520. Server 520 has received characteristics of the communications network by direct measurement, and has received characteristics of the video-conference parties 502, 508, 514. Accordingly, the server 520 may make a link quality requirement determination for the video conference. Server 520 then propagates this link quality requirement determination to the video conference parties 502, 508, 514.

In block 604, the client device 506, or alternatively server 520 makes a determination of the link quality capability of the communications link between client device 506 and server 520. In the latter embodiment, server 520 may propagate the determination of the link quality capability to the client device 506.

In block 606, the client device 506 then adapts the video capture data rate based on the link quality requirement and the link quality capability. Upon doing so, in block 608, client device 506 changes a video-capture parameter to adapt to the determined video capture data rate. Upon capture, in block 610 the raw data is transcoded and then streamed to the server 520. This process is as described with respect to FIG. 4.

Note that some optimizations may be specific to video conferencing. For example, where a static document is being shown, the frame rate may be greatly reduced. Similarly, if the display of the video conference is dominated by documents, the resolution and the frame rate of the video streams of the parties may be reduced. Accordingly, the server may track these characteristics and forward to the parties 502, 508, and 514 for use in video conference optimization.

Server 520 receives video streams from Party B 508 and Party C 514. The server 520 can then forward the received video streams Party A 502. In block 612, Client Device A 506 receives the forwarded video streams and may make a determination on how best to render or present the video streams. In block 614, Client Device A 506 renders the video streams.

Note that because Parties A 502, B 508, and C 514 affirmatively adapt their data rates based on information about the communications link as stored in the server 520, client processing is minimized, and QoS and QoE is optimized. Further note that QoS and QoE optimizations may be balanced with other optimization decisions, such as to extend power for mobile clients. For example, mobile clients may have frame rates decreased affirmatively while fixed clients maintain a high frame rate. Since lower frame rates use less processing resources, mobile clients will conserve power.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of optimizing video-call quality substantively in real time, comprising:
   determining at a communications terminal engaged in a video-call session, a link quality capability of a communications channel for the video-call session;
   receiving or determining a characteristic related to the communications terminal or to another communications terminal engaged in the video-call session;
   determining a link quality requirement for the video-call session based at least in part on the characteristic;
   based on the link quality capability determination and the link quality requirement determination, changing at least one video-capture parameter;
   based on the at least one video-capture parameter, capturing video data for the video-call session with at least one video-camera;
   transcoding the captured video data; and
   transmitting the captured video data as part of the video-call session.

2. The method of claim 1, wherein the determining of the link quality capability and the link quality requirement occurs at a time determined by any one of:
   a sampling time whose period is linear,
   a sampling time whose period is interpolated, and
   a sampling time which is dynamically set.

3. The method of claim 1, wherein the determining of the link quality capability and the link quality requirement is triggered by any one of:
   an application event trigger,
   a radio signal quality, and
   a notification of communications network congestion.

4. The method of claim 1, wherein the communications terminal has a plurality of video-cameras that may capture video data for the video-call session, and at least one of the video-cameras has a different capture resolution than the other video-cameras; and
   the determining of the link quality requirement for the video-call session is based on which of the video-cameras is used to capture video data for the video-call session.

5. The method of claim 1, wherein the video-capture parameter to be changed is any one of:
   a video capture resolution, and
   a number of frames per second to capture.

6. The method of claim 1, wherein the video call link quality requirement determination is based in part on optimizing power draw on the communications terminal.

7. The method of claim 1, wherein the determination of the link quality capability or the link quality requirement is manually triggered by a user.

8. A method of optimizing video-call quality substantively in real time, comprising:
   determining a link quality capability of a communications channel for a video-call session for a plurality of parties, wherein the determining is based on at least one of the following characteristics:
   a characteristic of a user participating as a party on the video-call session,
   a characteristic of a client device used for the video-call session,
   a characteristic of an operating system of a client device used for the video-call session,
   a characteristic of a video-call application used for the video-call session, a characteristic of a local cell sector in the wireless communications chain used for the video-call session, a characteristic of an air interface between the client device in the wireless communications chain used for the video-call session, and a characteristic of a backhaul communications infrastructure in the wireless communications chain used for the video-call session;

receiving or determining another characteristic related to the communications terminal or to another communications terminal engaged in the video-call session;

determining a link quality requirement for the video-call session based at least in part on the other characteristic; and based on the determined link quality capability and on the determined link quality requirement, adapting the data capture rate for at least one party in the video call-session.

9. The method of claim 8, wherein the at least one characteristic used to determine the link quality capability of the communications channel for the video-call session is retrieved from a static profile.

10. The method of claim 8, wherein the at least one characteristic used to determine the link quality capability of the communications channel for the video-call session is obtained via calculating a statistical summary of a set of samplings of the at least one characteristic.

11. The method of claim wherein the at least one characteristic used to determine the link quality capability of the communications channel for the video-call session is dynamically determined substantially in real time.

12. The method of claim 8, wherein the at least one characteristic used to determine the link quality capability of the communications channel for the video-call session is any one of:
 a channel quality information (CQI) characteristic,
 a sector load characteristic,
 a carrier to interference ratio,
 a discontinuous reception metric (DRX), and
 a discontinuation transmission metric (DTX).

13. The method of claim 8, wherein the link quality capability determination is based in part on optimizing power draw on a communications terminal participating in the video-call session.

14. A method of optimizing video-call quality for a video-call with a plurality of users substantially in real time, comprising:
 receiving at a communications terminal of a party engaged in a video-call session at least one characteristic of another party engaged in the video-call session;
 determining at the communications terminal, a link quality capability of a communications channel for the video-call session and a link quality requirement for the video-call session based on the received at least one characteristic; and
 based on the link quality capability determination, adapting the data capture rate for at least one party in the video call-session.

15. The method of claim 14, wherein the at least one characteristic is any one of:
 a load percentage, and
 a measured achievable bitrate.

16. The method of claim 14, wherein the link quality capability determination is based in part on optimizing power draw on a communications terminal participating in the video-call session.

17. A method of sampling video-call characteristics substantially in real time comprising:
 measuring a link quality capability characteristic of a communications channel for a video-call session for a plurality of parties, wherein the characteristic is one of the following:
  a characteristic of a user participating as a party on the video-call session,
  a characteristic of a client device used for the video-call session,
  a characteristic of an operating system of a client device used for the video-call session,
  a characteristic of a video-call application used for the video-call session,
  a characteristic of a local cell sector in the wireless communications chain used for the video-call session,
  a characteristic of an air interface between the client device in the wireless communications chain used for the video-call session, and
  a characteristic of a backhaul communications infrastructure in the wireless communications chain used for the video-call session;
 measuring a link quality requirement for the video-call session;
 determining an amount that the video-call data capture rate should be adapted based on the characteristic measurement and the link quality requirement measurement; and
 storing the characteristic measurement, the link quality requirement measurement and the amount of the video call data capture rate adaptation in a knowledge base according to a correlation routine.

18. The method of claim 17, further comprising:
 sending a query to the knowledge base;
 retrieving at least one stored characteristic measurement, at least one link quality requirement measurement, and at least one video call data capture rate adaptation from the knowledge base, based on the query; and
 performing statistical analysis on the retrieved at least one stored characteristic measurement, at least one link quality requirement measurement, and at least one video call data capture rate adaptation.

19. A method to optimize a video conference substantially in real time, comprising:
 receiving a video conference link quality requirement that is based on a characteristic of a communications terminal engaged in the video conference session;
 determining at a communications terminal engaged in a video conference session, a link quality capability of a communications channel for the video conference session;
 based on the determined link quality capability and the received video conference link quality requirement, changing at least one video-capture parameter;
 based on the at least one video-capture parameter, capturing video data for the video conference session with at least one video-camera;
 streaming the captured video data to a server;
 receiving from the server a first and a second captured video data stream from a first other communications terminal and a second other communications terminal both engaged in the video conference session; and
 presenting a composite of the received first captured video data stream and the received second captured video data stream.

20. A system for optimizing video-call quality substantially in real time, comprising:

receiving a characteristic relating to a wireless communications link for a video-call session;
determining at a communications terminal engaged in a video-call session, a link quality capability of a communications channel for the video-call session based at least on the received characteristic relating to the wireless communications link;
measuring a characteristic relating to the communications terminal;
determining at the communications terminal, a link quality requirement of the video-call session, based on the measured characteristic relating to the communications terminal;
based on the determined link quality capability and the determined link quality requirement, changing at least one video-capture parameter;
based on the at least one video-capture parameter, capturing video data for the video-call session with at least one video-camera;
transcoding the captured video data; and
transmitting the captured video data as part of the video-call session.

* * * * *